Patented Apr. 10, 1928.

1,665,264

UNITED STATES PATENT OFFICE.

HARRY N. HOLMES AND JOHN A. ANDERSON, OF OBERLIN, OHIO.

SILICA GELS AND PROCESS OF MAKING THE SAME.

No Drawing.　　Application filed August 10, 1923.　Serial No. 656,716.

This invention relates to silica gels and the process of making the same.

The particular object of the present invention is the production of a silica gel with a greater degree of porosity than such gels heretofore known, with the necessary high gas adsorbtive properties and the additional ability of effectively employing the product for filtration purposes, especially in the filtration of oils for removing therefrom color and offensive odors or impurities in general.

Silica gels have heretofore been prepared by acidifying a proper solution of a suitable silicate, such as water glass, to form a gelatinous mass from which the soluble salt is removed and the water driven off to produce a hard glass-like product containing ultra-microscopic pores, the adsorbing properties of which are well known.

Walter A. Patrick (Canadian Patent No. 217,365, granted March 28, 1922,) also described the production of gels for catalytic purposes, in the production of which he secures the well known ultra-microscopic porous condition in a silica or other gel containing other material with either catalytic or chemical properties, such as an oxide of iron, aluminum, copper, magnesium, cadmium, zinc or manganese, the mixture being prepared for use as a catalyzer or for the production of a chemical effect because of the metallic oxide it contains, which is presented in silica gel form and thereby enhances or makes more active its chemical or catalytic properties because of the large surface presented.

Our invention consists in the production of a silica gel with a higher degree of porosity than other gels heretofore known, by the initial precipitation of a soluble heavily hydrated acidic anhydride, such as hydrated silica, intimately mixed in the act of precipitation with a suitable insoluble metallic oxide, also hydrated, and the subsequent removal of such insoluble metallic oxide after drying this gelatinous precipitate or gel to a rigid solid, thus securing not only the usual ultra-microscopic pores left by the removal of water, and ranging from, say four to ten millimicrons in size, but also an additional number of larger pores ranging in size up to a size just visible with the strongest microscopes, and obtained by the removal of the insoluble metallic oxide. This removal of the insoluble metallic oxide is accomplished by treatment of the dried rigid gel with a suitable acid, or with a base, which reacts chemically with the metallic oxide to convert it into a soluble salt readily washed out with water. This improved process has been carried out in practice as follows:

100 cubic centimeters of sodium silicate solution of 1.375 specific gravity or even as low as 50 cubic centimeters was diluted with 1,000 cubic centimeters of water. With this solution was slowly mixed 150 cubic centimeters of a twice normal solution of ferric chloride. The resulting gel or gelatinous precipitate was dried slowly at a temperature not much above room temperature until it became a hard solid, whereupon it was treated with a six normal solution of hydrochloric acid to convert the insoluble ferric oxide resulting from the reaction between the ferric chloride and sodium silicate into soluble ferric chloride. The ferric chloride and other soluble compounds formed in the reactions were then washed out with water, the ferric chloride being recovered for further use, if desired. Preferably the water should be hot, and if the dried gel is steamed just before its treatment with acid it is less likely to be broken into small lumps. The product, washed clear of the soluble chlorides, is again dried to its final form in the same manner as ordinary silica gel, and is a hard mass. The invention is not limited to the use of ferric chloride as described in the illustration for other soluble iron salts may be used or a soluble nickel salt or, in fact a solution of any metallic salt which when mixed with a soluble silicate yields a gel or a gelatinous precipitate. The intimacy of mixture thus secured is far superior to that secured by mere stirring in of some insoluble oxide while a silica gel is setting.

A silica gel, prepared in the manner described, especially with the greater quantity (100 cubic centimeters) of silicate, is very highly selectively adsorbent towards certain gases. In addition, such gels may be successfully used in filtration processes. For example, the gel prepared with 50 cubic centimeters of silicate not only is highly adsorbent but has also been used for the filtration of a rank petroleum oil, chosen for the purpose because it contains considerable sulphur and is difficult to refine. The sample of our silica gel was utilized to filter this petroleum oil in parallel with another silica gel prepared by the older process of addition of an acid to water glass and washing and drying the gel product. It was found that the filtrate comes through our gel much more rapidly than through the ordinary gel. Our filtrate at first was as clear as kerosene and nearly free of sulphur odor, being followed by other filtrate having the usual clear, rich colors of lubricating oil, after which the filtrate became darker and darker. The filtrate coming through the ordinary gel sample was practically black from the start, and in this case the removal of sulphur was not quite so marked as when our gel was used.

Obviously other soluble silicates than sodium silicate may be used. Indeed, as described in the Canadian Patrick patent, above mentioned, other substances than silicates may be used. Moreover, any suitable metallic oxides or bases may be used which are capable of being formed intimately mixed in the silica gel and removed therefrom by subsequent conversion into soluble compounds which are then washed out so as to leave a very highly porous gel.

The product is useful in many ways, not only for its ability to absorb gases but also because of its ability to separate compounds in the act of filtration.

What we claim is:

1. The process of preparing hard silica gel with great porosity, comprising mixing a soluble silicate solution with a solution of a metallic salt to form hydrated silica, a soluble salt, and an insoluble metallic oxide, drying in a manner to produce and preserve in a rigid structure and without material shrinkage the usual ultra-microscopic pores, adding an acid to convert the insoluble metallic oxide into a soluble metallic salt, and washing out soluble metallic and other salts, thereby producing additional pores and increasing the total porosity.

2. The process of preparing hard silica gel with great porosity, comprising mixing a soluble silicate solution with an excess solution of an iron salt to form hydated silica, a soluble salt, and iron oxide, drying in a manner to produce and preserve in a rigid structure and without material shrinkage the usual ultra-microscopic pores, treating with an acid to dissolve the iron oxide, and washing out the now soluble salts, thereby producing additional pores and increasing the total porosity.

3. The process of preparing silica gel, comprising deliberately mixing a soluble silicate solution with a material quantity of metallic chloride solution to form insoluble hydrated silica and a metallic oxide, dissolving out the metallic oxide by chemical reaction after drying to the form of a comparatively firm solid, and subsequently washing with water.

4. The process of increasing the porosity of inorganic gels, comprising precipitating a gel containing some material capable of conversion to soluble form by a given reagent and other material incapable of such conversion by the same reagent, treating said gel in a manner to produce the usual ultra-microscopic pores and to set and preserve the structure without subsequent material shrinkage of the pore walls, subsequently treating such gel with said reagent to thereby convert the first named material to water soluble form, and washing out the solution thereof, to thereby produce additional pores and increase the total porosity.

5. The process of preparing hard silica gel with great porosity, comprising deliberately mixing a solution of of soluble silicate and a material quantity of a substance forming therewith insoluble basic material, drying in a manner to produce and preserve in a rigid structure and without material shrinkage the usual ultra-microscopic pores, subsequently converting the insoluble basic material into a water soluble compound readily dissolved out, and then washing to remove said water soluble compound.

6. The process of preparing hard silica gel with great porosity, comprising deliberately mixing a solution of soluble silicate and an excess of a substance forming therewith insoluble metallic oxide and hydrated silica, drying in a manner to produce and preserve in a rigid structure and without material shrinkage the usual ultra-microscopic pores, subsequently converting the insoluble metallic oxide into a water soluble compound readily dissolved out, and then washing to remove said water soluble compound.

7. A process of preparing a hydrated inorganic gel, consisting in mixing a water solution of a soluble salt of an acid, whose anhydride can be heavily hydrated and is insoluble, with a readily hydrolizable salt of a metal to form a gel of intimately mixed insoluble hydrated metallic oxide and an insoluble heavily hydrated acidic anhydride, treating said gel in a manner to produce the usual ultra-microscopic pores and to set and preserve the form of the structure without subsequent material shrinkage of the pore walls, and removing the metallic oxide by its conversion into a water soluble compound by reaction with a suitable reagent and subsequent washing out of the soluble compound.

In testimony whereof we hereby affix our signatures.

HARRY N. HOLMES.
JOHN A. ANDERSON.